Sept. 27, 1966 J. W. STEVENS 3,276,024
ANTENNA WIND TORQUE REDUCER
Filed Aug. 6, 1962

INVENTOR.
JOSEPH W. STEVENS
BY
Lippincott, Ralls & Hendrickson
ATTORNEYS

United States Patent Office 3,276,024
Patented Sept. 27, 1966

3,276,024
ANTENNA WIND TORQUE REDUCER
Joseph W. Stevens, Menlo Park, Calif., assignor to Textron Inc., Belmont, Calif., a corporation of Rhode Island
Filed Aug. 6, 1962, Ser. No. 214,868
9 Claims. (Cl. 343—757)

This invention relates to an antenna wind torque reducer and, more particularly, to a device for reducing wind-induced torque imposed on an antenna and its mounting.

A major problem encountered in large rotating antennas arises from wind impinging the antenna attempting to twist it away from its intended angular orientation. This is particularly true of an antenna or similar device presenting a large surface area to the wind, such as a parobolic reflector. In directional antenna of this type, the antenna is rotated to a selected orientation, or may be rotated continuously, and, if torque resulting from wind or any other source tends to disturb the orientation, the quality of signal transmission or reception may be impaired. In large rotating antennas, the wind torque may even strain the bearings or other parts of the mounting structure, and impose substantial additional loads upon the motors that rotate the antenna, thereby making necessary the use of larger and more expensive motors, bearings, and other parts. Others have attempted to counteract wind torque by providing fixed auxiliary surfaces or sails that oppose the torque action of the prevailing wind, but such devices are relatively ineffective when the wind shifts to originate from another direction, or when the antenna is rotated to another orientation, and under some circumstances may even aggravate the undesirable effects of the shifting wind. An object of this invention is to provide an antenna wind torque reducer that is effective to balance torque induced by wind originating from any direction relative to the antenna.

This invention is particularly applicable to an antenna having a parabolic reflector which may be rotated. On the outer convex surface of the reflector, there is provided a plurality of vanes that are individually movable from a retracted position to an extended position. In their extended positions, the vanes, when the wind engages them, induce a torque in the antenna mounting, different vanes being provided to produce torques in different directions, the extension of the vanes being automatically controlled to provide a net torque in a direction opposite to that produced by the wind action against the parabolic reflector itself. Preferably, the vanes are arranged in pairs, such that the torque induced by one vane of a pair is in a direction opposite to that induced by the other vane of the same pair. Preferably, four vanes are provided, one pair of vanes operating to reduce the wind torque in a horizontal plane, and another pair of vanes operating to reduce the wind torque in a vertical plane. In combination with each pair of vanes, there is provided a sensing device, such as a strain gauge on the rotary mounting of the antenna, adapted to sense torque in the mounting and to generate a signal in accordance therewith. A characteristic of the signal, such as its polarity, is made dependent upon the direction of the torque, for controlling motors operating the vanes in accordance with the signal to extend the proper vanes by the proper amounts to compensate for the wind torque.

Other objects and advantages of this invention will become apparent from the following description and the accompanying drawings, wherein.

Figure 1:
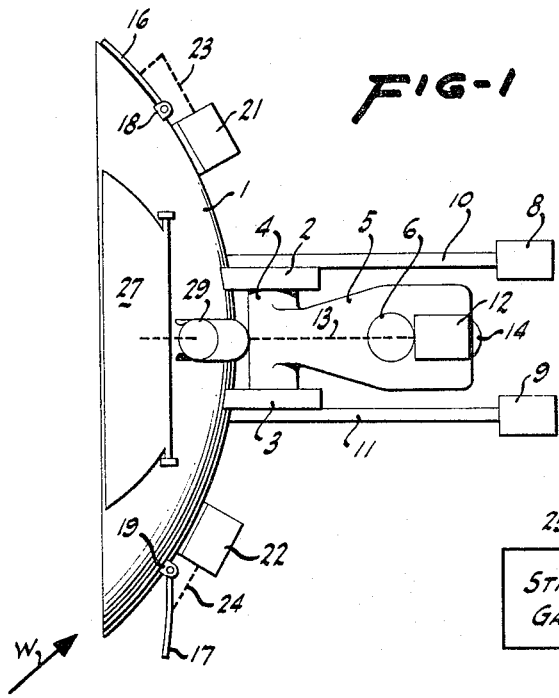
FIG. 1 is a somewhat schematic plan view of an antenna embodying this invention.
Figure 3:
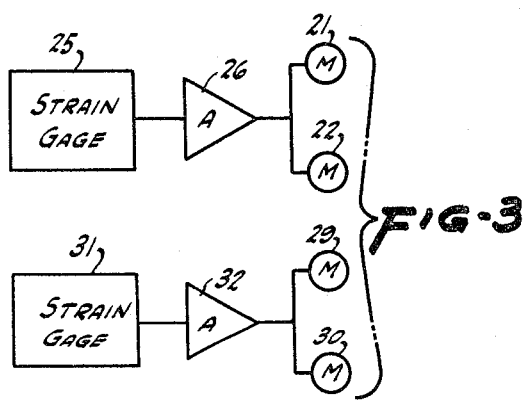
FIG. 3 is a schematic circuit diagram of the servo system for automatically adjusting the vanes of the same antenna.
Figure 2:
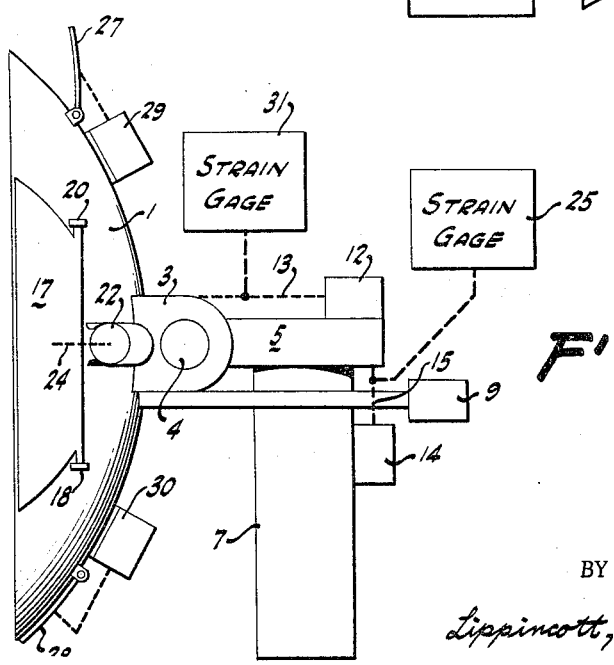
FIG. 2 is a side elevation of the same antenna.

Referring now to the drawings in greater detail, there is shown an antenna including a parabolic reflector 1 on the convex back of which are a pair of mounting brackets 2 and 3. These mounting brackets are pivotally carried on a horizontal shaft 4, which, as shown, is attached to one end of a support arm 5. The arm 5 is rotatable about a vertical shaft 6, supported by a vertical column 7 or any other appropriate supporting structure. Thus, the reflector 1 may be rotated about the horizontal shaft 4 and the vertical shaft 6 to any desired angular orientation. Preferably, the weight of reflector 1 is balanced with respect to shaft 4 by counterweights 8 and 9 attached to the ends of rearwardly extending arms 10 and 11, as shown. Rotation about horizontal shaft 4 is produced by a motor 12, which may be mounted on carriage 5 and connected to reflector 1 by any appropriate type of mechanical linkage, as is indicated by broken line 13. Rotation about vertical shaft 6 is produced by a motor 14, which may be mounted on support 7 and connected to arm 5 by any appropriate mechanical linkage, as is indicated by broken line 15.

Referring to FIG. 1, when the wind impinges on reflector 1 from the direction indicated by arrow W, it tends to turn the antenna in the clockwise direction about vertical shaft 6, thereby producing torque in the drive linkage 15. Such torque may impose a serious stress in the drive mechanism, could deflect the antenna from its intended direction of orientation and diminish the quality of the signal, and in any event would necessitate the use of larger driving motors, supports, and linkages.

In order to counteract such effects of wind torque, I provide at least one pair of movable vanes 16 and 17 on opposite sides of the antenna. In the preferred embodiment illustrated, vanes 16 and 17 are mounted on the back side of parabolic reflector 1, but if desired they may be mounted further to the rear—as far back as the counterweights 8 and 9. The vanes 16 and 17 are pivotably mounted on brackets, as illustrated at 18, 19 and 20, so as to be movable from a retracted position, as represented by the vane 16, to an extended position, as represented by the vane 17. When a vane is extended, in the position of vane 17, it provides an additional surface against which the wind impinges to produce a torque in the antenna mounting. By extending vanes 16 and 17 selectively, by appropriate amounts, the net wind torque tending to rotate the antenna about vertical shaft 6 can be reduced to a small value, approaching zero.

Motors 21 and 22 are provided for selectively extending and retracting the vanes 16 and 17, respectively. As illustrated, motors 21 and 22 may be mounted on the back side of reflector 1 and connected to vanes 16 and 17 by any appropriate mechanical linkage, represented by broken lines 23 and 24. These motors are operated automatically, responsive to torque detecting means, to minimize the wind-induced torque. For this purpose, in the embodiment illustrated, a strain gage 25 is mechanically connected to the driving system so that it overcomes any wind-induced torque tending to rotate the antennas about vertical shaft 6. Responsive to such torque, the strain gage supplies a signal to control means, which may be an elaborate servo system or a simple amplifier 26, operating motors 21 and 22 to extend one of the vanes 16 and 17 and to retract the other, until the torque is reduced to a small value.

Also, as shown in the drawing, a second pair of vanes 27 and 28 may be provided to counteract wind torque tending to rotate the antenna about the horizontal shaft 4. These vanes are extended and retracted, selectively, by motors 29 and 30, which are automatically operated to reduce the wind-induced torque to a small value. Strain gage 31, mechanically connected to the drive mechanism for rotating the antenna about the horizontal arm, provides a signal through servo system, an amplifier 32 for operating motors 29 and 30 to extend one of the vanes 27 and 28, and to retract the other, until the wind torque is substantially cancelled out.

While a preferred embodiment of this invention has been described and illustrated, modifications and changes thereto may be made by those skilled in the art without departing from the spirit and scope of this invention, as defined by the claims appended hereto.

What is claimed is:

1. A wind torque reducer for a member mounted upon a support and having a surface exposed to wind action, comprising:
   a vane movable on said member from a retracted position to positions extended therefrom,
   said vane when in an extended position being subjected to wind action which imposes a torque on the support for said member in opposition to said wind torque,
   actuator means operative when energized to move said vane to an extended position, and
   means responsive to the presence of wind torque for energizing said actuator means.

2. In combination with a rotatable member carried on a pivotal mounting with drive means for rotating said member to selected angular positions, said member having a surface exposed to wind action which imposes a wind torque on said mounting, a wind torque reducer comprising:
   a vane movable on said member from a retracted position to positions extended therefrom,
   said vane when in an extended position being subjected to wind action and being positioned relative to said pivotal mounting that wind action thereagainst imposes a torque on said mounting in opposition to said wind torque,
   actuator means operative when energized to move said vane to an extended position, and
   means responsive to the presence of wind torque an said mounting for energizing said actuator means.

3. In combination with a rotatable member carried on a pivotal mounting with drive means for rotating said member, said member having a curved surface exposed to wind action, so that wind forces act unequally on opposite sides of the mounting to apply torques thereto, a wind torque reducer comprising:
   a vane movable on said member from a retracted position to positions extended therefrom,
   said vane when in an extended position being transverse to the wind direction so as to be subjected to wind action and being disposed on the other side of said diameter of the pivotal mounting so that wind action thereagainst imposes a torque on said mounting in opposition to said wind torque,
   actuator means operative when energized to move said vane to an extended position, and
   means responsive to the presence of wind torque for energizing said actuator means.

4. In combination with a concave member which is mounted about an axis parallel to the axis of its concavity, portions of said concave member being exposed to wind action which imposes a wind torque in one direction about said mounting axis, a wind torque reducer comprising:
   a vane movable on said member from retracted position to positions extended therefrom,
   said vane when in an extended position being subjected to wind action and being positioned relative to said mounting axis that wind action thereagainst imposes a torque in opposition to said wind torque,
   actuator means operative when energized to move said vane to an extended position, and
   means responsive to the presence of wind torque for energizing said actuator means.

5. A wind torque reducer for a member mounted on a support and having a surface exposed to wind action which imposes a wind torque on said support comprising:
   a pair of vanes each movable on said member from a retracted position to positions extended therefrom,
   each of said vanes when in extended positions being subjected to wind action which imposes a torque on said support,
   the torques imposed by wind action against said vanes being in opposite directions about said support,
   a pair of actuator means each operative when energized to move one of said vanes to an extended position, and
   means responsive to the direction of wind torque for energizing an actuator means to oppose said wind torque.

6. A wind torque reducer for a member mounted on a support and having a concave surface exposed to wind action which imposes a wind torque on said support therefor comprising:
   a pair of vanes on opposite sides of said support, each movable on said member from a retracted position to positions extended therefrom,
   each of said vanes when in extended positions being subjected to wind action which imposes a torque on said support member,
   the torques imposed by wind action against said vanes being in opposite directions about said support,
   a pair of actuator means each operative when energized to move one of said vanes to an extended position, and
   means responsive to the direction of wind torque for energizing an actuator means to oppose said wind torque.

7. A wind torque reducer for a member mounted upon a support and subjected to wind forces which apply a torque on said support, comprising:
   at least one vane mounted upon said member and movable between retracted and extended positions relative to said member,
   drive means engaging each vane for moving the vane between retracted position out of the wind and extended positions transversely into the wind,
   sensing means engaging said support and sensing torque thereon, and
   means responsive to said sensing means connected to and controlling said drive means to move each vane into extended positions that reduce torque on said support.

8. A wind torque reducer as set forth in claim 7, further characterized by said sensing means comprising at least one strain gauge producing signals responsive to torque of said support.

9. A wind torque reducer for a member mounted at a single point by support means and subjected to wind forces, comprising:
   at least one pair of vanes movably mounted one on each side of said member, said vanes being movable between extended positions to receive wind forces and retracted position in which they are substantially unaffected by wind forces;
   drive means engaging said vanes for individually moving the vanes between retracted and extended positions;
   sensing means engaging said support means and producing signals responsive to torque of the support and torque direction; and
   means energizing said drive means from the sensing means signals to selectively move individual vanes into positions to transfer wind torque to said member therefrom in opposition to wind torque directly experienced by said member.

References Cited by the Examiner
UNITED STATES PATENTS

| | | | |
|---|---|---|---|
| 1,567,229 | 12/1925 | Boyler | 188—87 |
| 1,575,802 | 3/1926 | Valkenberg | 244—113 |
| 2,947,989 | 8/1960 | Ford et al. | 343—757 |

FOREIGN PATENTS

| | | |
|---|---|---|
| 1,123,717 | 2/1962 | Germany. |
| 808,961 | 2/1959 | Great Britain. |

HERMAN KARL SAALBACH, *Primary Examiner.*

E. LIEBERMAN, *Assistant Examiner.*